(12) United States Patent
Brik

(10) Patent No.: US 8,806,900 B2
(45) Date of Patent: Aug. 19, 2014

(54) CERAMIC BUSHING/S CONSISTING LOCAL HEATING/S INTEGRATED IN APPARATUS FOR MANUFACTURING MINERAL/BASALT FIBERS

(75) Inventor: Alexesy V. Brik, Madison, WI (US)

(73) Assignee: Reforcetech AS, Roeyken (NO)

( * ) Notice: Subject to any disclaimer, the term of this patent is extended or adjusted under 35 U.S.C. 154(b) by 1609 days.

(21) Appl. No.: 11/395,582

(22) Filed: Mar. 30, 2006

(65) Prior Publication Data

US 2006/0218972 A1    Oct. 5, 2006

Related U.S. Application Data

(60) Provisional application No. 60/667,586, filed on Apr. 4, 2005.

(51) Int. Cl.
  *C03B 37/01*    (2006.01)
(52) U.S. Cl.
  USPC ................ 65/495; 65/499; 65/502; 65/145
(58) Field of Classification Search
  USPC .......... 65/492, 495, 499, 502, 540, 145, 346, 65/347
  See application file for complete search history.

(56) References Cited

U.S. PATENT DOCUMENTS

| | | | |
|---|---|---|---|
| 2,377,772 A * | 6/1945 | Fletcher et al. ................ | 65/499 |
| 3,013,096 A | 12/1961 | Glaser | |
| 3,048,640 A | 8/1962 | Glaser | |
| 3,142,551 A * | 7/1964 | Von Wranau .................. | 65/499 |
| 3,198,615 A * | 8/1965 | Stalego .......................... | 65/474 |
| 3,264,076 A | 8/1966 | Veazie et al. | |
| 3,331,673 A * | 7/1967 | Bour .............................. | 65/130 |
| 3,468,643 A * | 9/1969 | Stalego et al. ................. | 65/499 |
| 3,475,147 A | 10/1969 | Stalego | |
| 3,557,575 A | 1/1971 | Beall | |
| 3,854,986 A | 12/1974 | Chvalovsky et al. | |
| 3,912,477 A * | 10/1975 | Brady et al. .................... | 65/499 |

(Continued)

FOREIGN PATENT DOCUMENTS

| | | |
|---|---|---|
| FR | 1116519 A | 5/1956 |
| GB | 763160 A | 12/1956 |

(Continued)

*Primary Examiner* — John Hoffmann
(74) *Attorney, Agent, or Firm* — Foley & Lardner LLP

(57) ABSTRACT

Several versions of ceramic bushing/s consisting local heating element/s integrated in apparatus for manufacturing mineral/basalt fibers from natural basalt rocks have been designed based on alternatives to Pt/Pt-Rd bushings approach. The ceramic bushing/s having local heating element/s concept promotes minimization or complete replacement of platinum group metals from the process of continuous basalt fiber manufacturing. More specifically, the invention discloses ceramic bushing/s comprising in combination apparatus are designed for manufacturing continuous mineral (basalt) fibers from 7 to 20 micrometers ($\mu m$), and also the coarse fibers from 20 $\mu m$ to 100 micrometers ($\mu m$) in amorphous structural state which exhibit flexible/ductile properties. The minimization or complete replacement of the precious Pt, Rd metals allows reduce the cost of basalt fiber therefore increase its compatibility in reinforced concrete/composite applications including Three Dimension Fiber Reinforced Concrete—3D FRC and many other applications. The currently available Pt-Rd orificed bushings are applied for basalt fiber industry greatly limit both the initial raw materials composition, and the efficiency of continuous basalt fiber production increasing their cost. The ceramic bushing/s consisting local heating elements are integrated in apparatus all together capable provide operations from natural basalt rock melting, homogenous basalt glass body preparation, basalt glass body supply to the bushings positioned beneath the bottom platform of the feeder's forehead.

7 Claims, 5 Drawing Sheets

(56) References Cited

U.S. PATENT DOCUMENTS

| | | | |
|---|---|---|---|
| 3,926,600 A | * | 12/1975 | Stalego .................. 65/499 |
| 3,929,497 A | | 12/1975 | Clark-Monks |
| 4,009,015 A | | 2/1977 | McCollister |
| 4,026,689 A | * | 5/1977 | Higginbotham ............ 65/499 |
| 4,058,386 A | | 11/1977 | Faulkner et al. |
| 4,088,467 A | | 5/1978 | Shono et al. |
| 4,140,507 A | * | 2/1979 | Costin et al. .............. 65/475 |
| 4,149,866 A | | 4/1979 | Austin et al. |
| 4,155,731 A | * | 5/1979 | Byrnes et al. ............. 65/492 |
| 4,167,403 A | * | 9/1979 | Coggin ................... 65/493 |
| 4,199,336 A | | 4/1980 | Rittler |
| 4,328,015 A | | 5/1982 | Melan et al. |
| 4,328,019 A | * | 5/1982 | Dejaiffe et al. ............. 65/19 |
| 4,343,637 A | | 8/1982 | Shofner et al. |
| 4,344,785 A | * | 8/1982 | Jensen .................... 65/488 |
| 4,363,645 A | | 12/1982 | Eisenberg |
| 4,364,762 A | | 12/1982 | Sullivan et al. |
| 4,398,933 A | | 8/1983 | Lecron et al. |
| 4,401,451 A | | 8/1983 | Lecron et al. |
| 4,437,869 A | | 3/1984 | Lecron et al. |
| 4,468,931 A | | 9/1984 | Wooding |
| 4,469,499 A | | 9/1984 | Lecron et al. |
| 4,488,891 A | | 12/1984 | Grubka et al. |
| 4,534,177 A | | 8/1985 | Wooding |
| 4,560,606 A | | 12/1985 | Rapp et al. |
| 4,636,234 A | | 1/1987 | Huey et al. |
| 4,664,688 A | | 5/1987 | Grubka |
| 4,675,039 A | | 6/1987 | Huey et al. |
| 4,676,813 A | | 6/1987 | Hanna |
| 4,698,085 A | | 10/1987 | Bengl et al. |
| 4,724,668 A | | 2/1988 | Wassenhoven |
| 4,775,400 A | | 10/1988 | Wright et al. |
| 4,822,392 A | | 4/1989 | Fachat |
| 4,853,017 A | | 8/1989 | Eberle et al. |
| 4,886,535 A | | 12/1989 | Bhatti |
| 4,917,725 A | | 4/1990 | Hara et al. |
| 4,917,750 A | | 4/1990 | Klose |
| 4,921,521 A | * | 5/1990 | Kremenets ............. 65/135.8 |
| 4,931,075 A | | 6/1990 | Kuhn |
| 4,950,355 A | | 8/1990 | Klose |
| 4,957,525 A | | 9/1990 | Gaertner et al. |
| 4,964,891 A | | 10/1990 | Schaefer |
| 5,057,173 A | | 10/1991 | Bihy et al. |
| 5,123,949 A | | 6/1992 | Thiessen |
| 5,134,179 A | | 7/1992 | Felegi, Jr. et al. |
| 5,147,431 A | | 9/1992 | Gaertner |
| 5,312,470 A | | 5/1994 | O'Brien-Bernini et al. |
| 5,352,260 A | | 10/1994 | Carlson et al. |
| 5,458,822 A | | 10/1995 | Bakhshi et al. |
| 5,490,961 A | | 2/1996 | Bakhshi et al. |
| 5,601,628 A | | 2/1997 | Buttigelli et al. |
| 5,614,132 A | | 3/1997 | Bakhshi et al. |
| 5,679,126 A | | 10/1997 | Loftas et al. |
| 5,800,676 A | | 9/1998 | Koike et al. |
| 5,866,486 A | | 2/1999 | Grove-Rasmussen et al. |
| 5,876,529 A | | 3/1999 | Grant et al. |
| 5,895,715 A | | 4/1999 | Huang |
| 5,954,852 A | | 9/1999 | Jensen et al. |
| 5,998,021 A | | 12/1999 | Loftas et al. |
| 6,044,666 A | * | 4/2000 | Burger et al. ............. 65/492 |
| 6,125,660 A | | 10/2000 | Gorobinskaya |
| 6,647,747 B1 | | 11/2003 | Brik |

FOREIGN PATENT DOCUMENTS

| | | |
|---|---|---|
| KR | 20030088159 A | 11/2003 |
| RU | 2017691 C1 | 8/1994 |
| RU | 2107046 C1 | 3/1998 |
| RU | 2111181 C1 | 5/1998 |
| SU | 589215 A1 | 1/1978 |
| SU | 874673 A1 | 10/1981 |
| SU | 881009 A1 | 11/1981 |
| SU | 937358 A1 | 6/1982 |
| SU | 990697 A1 | 1/1983 |
| SU | 1710527 A1 | 2/1992 |
| SU | 1724609 A1 | 4/1992 |
| SU | 1735214 A1 | 5/1992 |
| SU | 1761697 A1 | 9/1992 |

* cited by examiner

CERAMIC BUSHING/S CONSISTING LOCAL HEATING/S INTEGRATED IN APPARATUS FOR MANUFACTURING MINERAL/BASALT FIBERS

CROSS REFFERENCE TO RELATED APPLICATION

This application claims priority to Provisional Patent Application Ser. No. 60/667,586 filed Apr. 4, 2005.

TECHNICAL FIELD

The apparatus is related to the art of mineral fiber manufacturing from the heat softenable rock minerals (heat softenable material) such as basalts suitable for forming fibers to be drawn/attenuated into continuous multi-filament strand. More specifically, the invention discloses the apparatus and the ceramic bushing/s are designed to manufacture continuous mineral (basalt) fibers from 7 to 20 micrometers (μm) in diameter gathered into strand (roving) suitable to produce basalt composite rebars/cables which have the potential to replace steel bar in a variety of reinforced concrete/composite applications and the coarse fibers from 20 to 100 micrometers in diameter suitable for 3D-FRC applications. Basalt fibers are able to maintain their properties from cryogenic to +700 C temperatures. They exhibit high corrosion resistance in acid, salt water and alkaline cement based media's. The specific weight of rebar containing 80% of basalt fiber and 20% polymer bonding material is one third of steel while the tensile strength is three times greater than that of reinforced steel bar. The currently available Pt-Rd orificed bushings are applied for basalt fiber industry greatly limit both the initial raw materials composition, and the efficiency of continuous basalt fiber production increasing their cost. The goal of this invention is to develop an apparatus and multi-sectional ceramic bushing are integrated into a unite which functionality includes: natural basalt rock melt, homogeneous glass body preparation, homogeneous basalt glass body supply to the bushings are positioned beneath of the feeder forehead.

REFERENCES CITED [REFERENCED BY]

U.S. Patent Documents

| | | | |
|---|---|---|---|
| 6,647,747 | Nov. 18, 2003 | V. Brik | 65/492 |
| 6,125,660 | Oct. 03, 2000 | Gorobinskaya | 65/474 |
| 6,044,666 | Apr. 04, 2000 | Burger et al . . . | 65/492 |
| 5,998,021 | Dec. 07, 1999 | Loftas | 65/1 |
| 5,954,852 | Sep. 21, 1999 | Jensen et all . . . | 65/377 |
| 5,895,715 | Apr. 20, 1999 | Huang | 428/398 |
| 5,866.486 | Feb. 02, 1999 | Grove-Rasmussen | 5,866,486 |
| 5,614,132 | Mar. 25, 1997 | Bakhahi et. al . . . | 264/06 |
| 5,601,628 | Aug. 02, 1994 | Buttigelli et al . . . | 65/461 |
| 5,490,961 | Feb. 13, 1996 | Bakhahi et al . . . | 262/06 |
| 5,312,470 | May 17, 1994 | O'Brein-Berhii et al . . . | 65/12 |
| 5,057,173 | Oct. 15, 1991 | Bihy | 156/148 |
| 4,957,525 | Sep. 18, 1990 | Gaerther | 65/1 |
| 4,886,535 | Dec. 12, 1989 | Bhatti | 65/1 |
| 4,822,392 | Apr. 18, 1989 | Fachat | 65/16 |
| 4,724,668 | Dec. 12, 1989 | Wassenhoven | 57/333 |
| 4,698,086 | Oct. 06, 1987 | Bengl | 65/16 |
| 4,676,813 | Jul. 06, 1987 | Hanna | 65/16 |
| 4,664,688 | May 12, 1987 | Grubka | 65/1 |
| 4,534,177 | Aug. 13, 1985 | Wooding | 062/064 |

Foreign Patent Documents

| | | European | |
|---|---|---|---|
| KR2003088159 | 2003-11-19 | Yoo Suk Yung | D01F9/08 |
| | | Russian Federation | |
| Ru2111181 | 1998-05-20 | Gromkov B. K, et al. | C03B37/09 |
| Ru2107046 | 1998-03-20 | Gromkov B. K, et al. | C03B37/09 |
| 5040472/33 | Apr. 02, 1992 | Trefilov et al. | 5 C03 B 5/04 |
| | | Ukraine: | |
| 92310003 | Nov. 30, 1992 | Djigiris et al. | C 03 B 37/00 |
| | | USSR: | |
| 874673 | Nov. 26, 1979 | Kabanov et al. | C 03 B 5/04 |
| 937358 | Jun. 23, 1982 | Goglov et al. | 51 M C03 B 5/04 |

Other References

K. Loewenstein: The manufacturing Technology of Glass Fibers, (3d. Ed. 1993).
D. D. Djigiris, M. F. Mahova: Fundamentals of Production Basalt Fibers and Products, Moscow: Heat energetic, "Rock Age", 2002, 416 p.
V. Brik: Basalt Fiber Manufacturing and Their Applications, RTC-UW, Madison Wis., 1995, 125 p.

BACKGROUND OF THE INVENTION

The production of the continuous basalt fiber (roving) currently is based on the use of the Pt-Rd bushings. The efficiency of continuous basalt fiber manufacturing using Pt-Rd bushing is about one order of magnitude times less than the production of boron silicate E-glass fiber also utilizing Pt-Rd bushings. The low efficiency of the continuous basalt fibers production (when compared to that of E-glass fiber) essentially limits their commercial compatibility, even the properties of basalt fiber in many aspects better than that of E-glass fibers. Two main factors limit the efficiency of continuous basalt fibers production:
a)—the temperature of fiberization of continuous basalt fiber (roving) is about 200-250 degree centigrade greater than that of borosilicate E-glass fiber (containing roughly 10% of boron oxide). The high temperature processing of basalt fiber production increases the Pt-Rd busing deterioration (creep, sag, etc.).
b)—basalts by chemical composition present basic igneous rocks which containing the iron oxides in range of 7-15% (by mass).
The metallic iron reacts with platinum at the temperatures in range of 120° C., while the fiberization of continuous basalt fibers proceeds in range of 1260 C-1280 C.
The reaction of iron with platinum (Pt) proceeds via chemical reactive diffusion process. This process promotes the deterioration of platinum, reduces the term of Pt-Rd bushing operation. The losses of platinum in basalt fiber industry is essentially greater than that of Pt-Rd bushing used for E-glass fiber production
These factors provide negative impact on basalt fiber products cost. Even a one stage basalt fiber processing can be more economical than that of two stage E-glass fiber production. Basalt fiber manufacturing utilizing basalt rocks is one stage process. As opposed to basalt, E-glass fiber processing requires preliminary preparation of the raw material having predetermined chemical composition. The two stage E-glass fiber processing requires greater energy consumption than one stage process. However no yet bushings for basalt fiber roving are designed which operating as much long as Pt-Rd bushings for E-glass fiber industry. Because basalt—natural rock is tough material. Therefore the development of bushings capable operate at the temperatures greater than Pt-Rd bushings (1450 C) acute needed for production of continuous basalt fiber (roving). The alternatives to Pt-Rd bushings based on Fe—Cr-alloys are not perspective because the temperature operation of Fe—Cr-based alloys is even lower than that of bushings made from Pt-Rd-based alloys.

The current Pt-Rd bushings been in operation to manufacture basalt fiber roving usually consisting 200-400 orifices. While the E-glass fiber production is based on Pt-Rd bushings having 2000-4000 orifices. The matter of fact is that high melting point components are presented in basic igneous rocks are remaining not complete melted when the process proceeds at temperature 1450 C. Not complete melted high-melting point contaminants cause the orifices clogging, therefore the breakage of fiber filaments occurs when a stream of glass body is emitted from the orifices and then mechanically attenuated into continuous strand. Furthermore they appear centers of crystallization which provide negative impact on fiber properties. Especially ductile properties.

Apparently fiber become brittle due to presence of crystalline phase traces. Many failures occur between the bushing orificed withdraw plane and the applicator: U.S. Pat. Nos. 4,957,525; 4,886,535; 4,853,017. The past efforts to reduce breakage have emphasized the feed stock as the cause and the source of the cure. A large number of variables are presented in the art of a fiber forming process which tend to create a condition that encourages filament breakage in the fiber forming zone, see U.S. Pat. Nos. 5,312,470; 4,853,017; 4,676,813; 4,664,688; 4,488,891; 4,675,039; 4,469,499. Among other negative factor on fibers (filaments) formation is the presence of unacceptable heterogeneous glass body components containing highly stable aggregates of atoms referred to as "clusters". The clusters appear as forerunners of nucleus of crystalline phases that cause a great percentage of the failures of continuous basalt fibers. This factor appears to be permanent when the natural rocks (basalts) are used as initial raw material to manufacture continuous fibers.

Previous Art for Making Fiber.

Numerous fiber manufacturing apparatus and methods have been disclosed in the U.S. Pat. Nos. 6,125,660; 6,044,666; 5,954,852; 5,876,529; 5,800,676; 5,614,132; 5,601,628; 5,490,961; 5,458,822; 5,352,260; 5,312,470; 5,147,431; 5,134,179; 5,057,173; 4,964,891; 4,957,525; 4,950,355; 4,917750; 4,886,535; 4,853,017; 4,676,813; 4,664,688; 4,636,234; 4,534,177; 4,488,891 4,469,499; 4,437,869; 4,401,451; 4,398,933; 4,328,015; 4,199,336; 4,088,467; 4,009,015; 3,929,497; 3,854,986; 3,557,575; 3,475,147; 3,264,076; 3,048,640; 3,013,096.

The appearance of crystalline phase during fiberization can be significantly reduced if basalt glass body after homogenization at the temperature in range of 1450 C undergo additional heat-treatment at the temperature above 1450 C right before fiberization process. Important also increase the efficiency of mixing and the turbulence to flow of the melted basalt's. The good mixing provide positive impact on further stages of glass body preparation from the point of view of its homogeneity. The temperature operation of refractory materials of apparatus and ceramic bushing has to be great enough to maintain the temperature during additional heat-treatment after homogenization. It better decompose the high-melting point components in the area where from glass body is supplied to the orificed bushing discharge wall. The poor mixing and the hydrodynamic conditions of previously disclosed apparatuses do not allow complete decomposing of the high melting point contaminants. The not complete melted contaminants consisting the short range order of atoms (in range of elemental cells of crystalline structural state) tend to gather into the clusters. Even sub micron size clusters have the potential become the centers of crystallization during fiberization process. Even the traces of crystalline phase reduce the properties of fibers. The clusters tend to grow that cause the clogging of the orifices and the breakage of the continuous fiber.

The additional heat-treatment better provide inside of a ceramic bushing. This operation is disclosed in the U.S. Pat. No. 6,647,747. In accordance to U.S. Pat. No. 6,647,747 the ceramic bushing allows increase the temperature of basalt glass body to 1550 C inside of the upper chamber of a bushing. That is essentially greater than the average temperature of the homogenization which proceeds at 1450 C. The overheat treatment promotes to complete decomposing of the high melting point component are presented in the basic and intermediate (by $SiO_2$ content) igneous rocks. The effectiveness of the heat-treatment of glass body inside of the bushing, however is reduced, if the distance from the upper chamber (where the heat-treatment operation is provided) and the discharge wall at the bottom of the lower chamber (where from a glass body is delivered to the orificed discharge wall) too big, and the temperature inside of the lower chamber of bushing is not well controlled—main disadvantages of U.S. Pat. No. 6,647,747.

In general approach the closer the heater to discharge wall the better the conditions to control the temperature of fiberization process. No such conditions, however, disclosed in the U.S. Pat. No. 6,647,747. The metallic bushings are disclosed in U.S. Pat. Nos. 6,044,666; 5,312,470; 5,147,431; 4,931,075; 4,957,525; 4,775,400; 4,676,813; 4,675,039; 4,664,688; 4,364,762; 4,343,637 etc. The orificed discharge wall is heated by low voltage current at thousand Amps. The electric heaters are applied for precision temperature control of discharge wall, including discharge wall of Pt-Rd bushings.

However all metallic bushing suffer limited temperature operation, which is commonly not enough great to complete decompose the high melting point components which are presented in most basic basalt rocks.

Therefore all apparatuses in mentioned patents (are disclosed before the U.S. Pat. No. 6,647,747) exhibit disadvantage as regarding limited capability to complete decomposing of high-melting point contaminants during homogenization. They all routinely exhibit lock mixing, poor turbulence during melting process and poor volatile elements degassing which is important when the natural material basalt rock is used. The bushings in mentioned above patents appear exhibit drawback of glass body mixing, poor turbulence to flow and as result not complete the volatile elements degassing. The predetermined chemical composition allows borosilicate fiber processing at the temperature below 1100 C. That is not allowed for basalt fiber manufacturing. That is why the apparatuses for manufacturing basalt fiber are designed different way than those applied for E-glass fiber manufacturing. The apparatuses are designed for manufacturing basalt fiber have to satisfy special requirements due to basalt rock properties. The apparatuses are designed to manufacture continuous borosilicate glass fibers are not require efficient mixing, turbulence to flow and degassing. Nevertheless numerous patents disclose the apparatuses for basalt fiber manufacturing are not too much differs from apparatuses applied for borosilicate E-glass fibers.

In summation the apparatus and the bushings are designed for manufacturing mineral (basalt) fibers in U.S. Pat. Nos. 6,044,666; 5,954,852; 5,954,852; 5,458,882; 5,312,470; 5,123,949; 4,149,866; 4,636,234; 4,853,017; 4,822,392; 4,775,400; 4,560,606; 4,488,891; 4,343,637 exhibit poor volatile elements degassing, low-efficient glass body mixing, poor turbulence to flow during basalt rock melting. The glass fiber processing is easier to run when compared to that of basalt fiber manufacturing. The glass body having predetermined composition requires simpler operations to accomplish homogenization process. It is not require the volatile elements degassing, glass body turbulence to flow, as much as basalt glass body does. Mentioned factors are not important for glass fiber processing as much as for fibers are produced from natural basalt rocks. Basalt rocks require efficient melting, mixing, degassing and complete decomposing of all high melting point components. Basalt fiber roving manufacturing is tough process.

Nevertheless the interest to basalt fiber manufacturing is steadily growing. Especially when the price of still rebar applied for reinforced concrete tends to grow constantly. The fibers made from basalt rocks exhibit many attractive properties for a variety of applications and especially for reinforced concrete applications, where the low cost E-glass fiber cannot be used because have not sufficient properties. E-glass fiber tends to deteriorate in the alkaline environment which is typical for cement based materials. It deteriorate even under solar ultraviolet exposure.

E-glass fiber contains a boron oxide from 8% to 12% (in mass) and the high diffusion mobility boron atoms (due to their small size) promotes deterioration glass fiber properties. especially when they are exposed to salt water or cement based alkaline environments. E-glass fibers also deteriorates when is subjected to the action of the outdoor freeze-thaw exposure. Basalt fiber, as opposed to E-glass fiber, has not boron oxide ($B2O$). The Mechanical Performance/Price Ratio of basalt fiber is greater than other fibers currently available on the market.

Both Russian and Ukrainian apparatus (5040472/33 (1994); 92310003 (92); 4766933/00-33 (2)2 (89); 4823441/ 00-33 (22) (90); 4861059/00-33 (22) (90); 4793760/00-33 (22) (90) including USSR patents (990697; 937358; 881009; 874673; 589215) including U.S. Pat. Nos. 6,044,666, 6,125, 660 are referred to as similar to the present invention, because these apparatus/methods are designed to manufacture continuous fibers (roving) from the natural basalt rock materials. However the mentioned versions of apparatus are designed for industrial production of continuous basalt fiber (roving) are law efficient. The low efficiency of the basalt glass body preparation came from the apparatuses for manufacturing borosilicate fiber. Many features came from glass fiber industry to basalt fiber manufacturing without essential changing. The major problem of apparatuses designed for manufacturing glass fiber is their low-efficiency if they used to produce basalt fiber roving. Because poor mixing and not complete the high melting point complex oxides destruction/decomposing. All components of igneous rock have to be decomposed and the volatile components have to be degas from melted basalt.

Most apparatuses exhibit poor convection at the bottom, great gradient of basalt glass body viscosity at the depths chiefly due to the low heat transparent properties of basalt glass body, especially when gas heating is applied and gas burners are positioned on the top (on seal) of apparatus. The low infrared transparency of melted basalt causes a high gradient temperature and viscosity at the depths that significantly increases the time of uniform homogenization of basalt glass body. The convection and homogenization processes of basalt glass body are almost suppressed when the depth of bath is more than 50 millimeters (mm). The high viscosity causes the drawback of hydrodynamic characteristics at the depth greater 50 mm. The poor hydrodynamic characteristics are typical not only for bath type apparatus (discussed above), but also for horizontal apparatuses having straight stream basalt glass body to flow. It is reason why Russian/Ukrainian versions of horizontally extended apparatuses are designed to let basalt glass body to flow through horizontally extended zones having different depths Such horizontally extended apparatuses having zones with different depths are designed for basalt fiber roving manufacturing (Russian and Ukrainian versions). The temperature of melted basalt glass body in the apparatuses have been disclosed in the USSR Patent: 874673, CO3 B, 5/00.1981; Russian Patents, for example RU 2017691 C1, 30.04/92) drops at the depths at a rate in range of 5 degree centigrade per millimeter. The temperature gradient occurs due to a low infrared heat transparent property of the melted basalt glass body. The low heat transparency causes the crystallization at the bottom of apparatus. The viscosity of basalt glass body increases by depths dramatically if an additional heating is not provided. The accumulated high viscosity basalt glass body at the bottom of apparatus is named as "Harnisage" which means that basalt glass body flow in this layer is suppressed—almost "frozen". In some patents this layer is considered useful because it accumulates high gravity contaminants preventing their entrance into bushing. However the accumulation of high gravity contaminants (which commonly appear high melting point metal oxides) is not endless process. Upon accumulation the high-melting/high gravity contaminants sooner or later lead to the orifices clogging if they do not outlet from the furnace. Therefore the breakage and the reduction of the mechanical properties of basalt fibers (lowering the strength and the flexible properties) becomes substantial for apparatuses having poor glass body mixing and homogenization.

The Method for Manufacturing

Mineral Fiber having bath type furnace to melt rock materials and the forehead to feeder is disclosed in the U.S. Pat. No. 6,125,660. The concept of improvement in this patent based on variation of depths of bath/forehead ratio is not enough efficient when basalt rock is used. These improvements cannot prevent the problems which inherent mentioned above FSU and Ukrainian/Russian apparatus are designed to manufacture basalt fiber: low efficiency of basalt rocks melting and poor turbulence of melted glass body flow. The forehead is an extension of bath type melting zone of apparatus. The typical "dead zone" exists between melting and forehead which tend to become zone of crystallization. The "dead zone" is a place where the glass body crystallization due to presence of forerunners—the nucleation of centers crystallization are substantially created. When glass body is delivered to forehead of the feeder the complex oxides clusters appear forerunners of centers of crystallization. The traces of crystalline phases make fibers brittle. Especially when the diameter greater 20 micrometers ($\mu m$). Eventually coarse basalt fiber at the diameters greater than 20 micrometers ($\mu m$) appear substantially brittle properties that limits their applications for Three-Dimension Fiber Reinforced Concrete (3D FRC).

The natural basalt rocks present the heterogeneous eutectic system containing a variety of complex oxides of high melting point components (abortive, forsterite, nepheline, quartzite, etc.).

Many previous efforts are related to the fiber breakage problem (U.S. Pat. Nos. 4,957,525; 4,886,535; 4,853,017) were focused on an external environment action: bad sizing, rough aprons, unacceptable fan tension, cooling system, humidity, operator and other factors rather than the fundamentals of fiber structure formation. The natural rocks (basalts) are containing high-gravity iron rich components which tend to accumulate at the bottom of the apparatus. The accumulation of iron rich contaminants causes the damage to the orificed bushing m because iron and platinum (Pt) are react each other. It is reason why the cathode-anode electrode heating to melt basalt rock melting is not recommended when Pt-Rd bushings are applied. The apparatuses and methods for forming mineral basalt fibers are presented in the U.S. Pat. Nos. 6,125,660; 6,044,666; 5,954,852; 5,895,715. The U.S. Pat. No. 6,044,666 discloses a fiber forming apparatus for a variety melt materials utilizing insulating flow through the different configuration of bores and the bushing blocks—block assembly.

A bushing block with one or more bores extending through a peripheral region thereof to divert a portion of a supply of molten fiberizable material from a central region of the bushing block to the peripheral region of the bushing block. This apparatus and method for forming fibers, however, exhibits poor volatile elements outlet during glass body distribution from the center to the peripheral bores of the bushing block. Therefore glass body turbulence inside of the bushing block bores is similar to that disclosed in U.S. Pat. No. 5,312,470. The plurality of bores (passage ways for glass body) extending through the bushing blocks are designed to produce generally continuous filaments from natural organic (non-glass substances) than from the rock minerals, in particular, natural basalt rock minerals. The system of blocks of bushing bores made of refractory materials are not designed for glass body mixing and turbulent to flow and therefore cannot be used to provide basalt glass body homogenization process.

The U.S. Pat. No. 5,954,852 discloses a method of making fiber using a cascade of rotors from the melts at a viscosity less than 18 poise (at 1400 C). The glass body is poured onto the top of rotor at a viscosity less than 10 poise, wherein the other rotors are positioned lower. This method is not designed to make continuous basalt fibers (even a mixture of basalt and diabase melt is mentioned in this patent). The U.S. Pat. No. 5,895,715 discloses a method (blasting process) of making shaped fibers from a variety of fiberizable melt materials including such as rock slag or basalt. However blasting process cannot be used to produce continuous basalt fiber (roving).

The U.S. Pat. No. 5,601,628 discloses method for production of mineral wool, particularly made of basalt melt which is fiberized by internal centrifuging in a spinner having a peripheral wall with a plurality of orifices. To produce mineral wool with good fiber fineness and largely free of unfiberized particles, the length of the filament cones and the configuration of the heated gas flows generated around the spinner are adjusted so that the majority of the filament cones emanating from the spinner orifices intersects the isotherm corresponding to viscosity of 100 poises. This enables the tips of the filament cones to reach into a cool zone, thereby increasing the viscosity at the tip of the filament cones to avoid breakage of the filament cones to be attenuated. The basaltic materials, either natural or modified basalts are available for production of rock wool. However this method is not available to produce continuous basalt fibers.

The ultra-high velocity water cooled cooper spinner method is applied to manufacture a non-continuous size mineral fibers (U.S. Pat. Nos. 4,468,931; 4,534,177) and a spinning formation fiber rotary methods (U.S. Pat. Nos. 4,724, 668; 5,679,126; 4,917,725; 4,058,386) do not promote the production of continuous fiber with available properties. This method does not prevent the appearance of crystalline phase even at high speed rotations of spinner.

Previous Orificed Bushings Art Design

The industry of manufacturing glass fibers (including basalt fibers) for many years is used bushings made from precious metals such as platinum or platinum and rhodium (Pt-Rd) based alloys. These bushings, however, tend to creep or deform in service when applied to basalt fiber roving manufacturing due to high temperature fiberization in range of 1300 C. The creep or deformation adversely effects fiber quality. The deformation or "sag" requires the bushing to be prematurely removed from service. If corrosive affects don't take their toll on the bushing "sag" does. In addition, platinum reacts with iron is presented in basalts.

The bushings that have been disclosed at U.S. Pat. Nos. 6,044,66; 5,312,470; 5,147,431; 4,957,525; 4,853,017; 4,676,813; 4,664,688; 4,488,891; 4,469,499 typically include a bottom plate or wall, commonly referred to in art as a tip plate, which retains a pool of molten glass associated with the furnace. The Russian and Ukrainian versions of apparatus designed to manufacture basalt fiber locate the bushings separate (outside) separately from the main chamber where basalts melted and glass body homogenized. More specifically bushings are located underneath of the feeder's forehead.

The hydrostatic pressure of glass body in the feeders promotes molten glass to issue from the orifices of the bushing. However the hydrostatic pressure causes creep "sag" developing a curvature of the orificed plane (discharge wall) of the Pt-bushing at a temperature in range of 1300 C. As result the orificed plane of discharge wall becomes curved instead to be flat and such bushing has to be replaced (recycled).

The French Patent 1,116,519 discloses a bushing and a feeding source of molten glass combined with rotor equipped with a slop valve. The diameter of the filaments is modified by varying the speed of the rotor and its vertical position. The bushing base is generally "V"-shaped and has a series of parallel 'V'-shaped elements, at the summit of each a row of orifices provided. This particular design and placing of the glass under pressure is proposed for the purpose of preventing flooding. Apparatus consisting a rotor in order to regulate the glass body flow in an effort to inhibit the flooding, but not prevents it completely. The U.S. Pat. Nos. 4,676,813; 4,675, 039 discloses the method and apparatus for forming glass fiber. This invention provides the "drip less" type of feeder. This is accomplished by establishing a shallow layer of molten glass over an orificed discharge wall to provide the streams of molten glass for attenuation into filaments. The layer being maintained at a first level or depth to establish "non-drip less" operation to facilitate the restart of filament formation as desired.

Numerous efforts have been done in the past related to the improvement of orificed bushings. The U.S. Pat. No. 5,312, 470 discloses apparatus—feeder or bushing for producing glass fiber where the heat transfer members or fin shields have outwardly disposed surfaces with a ceramic coating bonded to those surfaces. The heat transfer surfaces also are in direct contact with and adjacent to the discharge wall of the feeder where they act as support members to support the orificed discharge wall. This combination especially useful in designing feeders or bushings having a greater number of orifices.

However, the apparatus—bushing are disclosed in this patent exhibit limited temperature of homogenization which cannot be increased due to metallic discharge wall. These apparatus or bushing cannot be used to manufacture mineral (basalt) fibers from natural rocks containing a high melting point complex oxides.

The apparatus for forming glass fiber has been disclosed in the U.S. Pat. No. 5,312,470 presents an apparatus having feeder combined with discharge wall of a bushing, e.g., the bottom of a feeder is a discharge wall of a bushing containing plurality of orifices-tips. A such design of apparatus—feeder or bushing also cannot be used to manufacture mineral basalt fibers from natural rocks. It cannot sufficiently homogenize the glass body of basalt rocks. The bushing is disclosed in U.S. Pat. No. 4,957,525 also made out of precious Pt-Rd metals. The development of bushing is disclosed in the U.S. Pat. No. 5,147,431. However it uses precious Pt-Rd metals. The additional wall positioned above the orificed discharge wall is disclosed in the U.S. Pat. No. 4,676,813 made from platinum. Great efforts to improve bushings characteristics have been done in the U.S. Pat. Nos. 4,488,891; 4,437,869; 4,363,645. Some patents, for example, U.S. Pat. No. 5,312,417, disclose the coatings and junctions utilizing ceramic materials (such as yttrium stabilized zircon) which exhibit the thermal-shock resistance, but precious Pt metal is applied for the bushing.

In the U.S. Pat. No. 6,647,747 is disclosed ceramic bushing to manufacture continuous Mineral/basalt fibers. The external induction and or internal electrode heating systems are used to provide basalt glass body heating inside of upper chamber of ceramic bushing. The overheating to 1550 C requires materials having enhanced properties of the internal wall of a bushing. There is also problem to maintain 1450 C nearby the discharge wall made from ceramic orificed plates. The lower chamber of ceramic bushing is disclosed in U.S. Pat. No. 6,647,747 patent has not such heating system.

The permanent temperature gradient between the upper and the lower chamber in range of 150-250 degree centigrade is required for ceramic bushing to run fiberization process in range of 1260 C-1280 C.

The temperature gradient between the upper chamber and an orificed ceramic discharge wall depends not only from the temperature inside of upper chamber, but also from the thermally conductive properties of basalt glass body and an intermediate plate which divides the upper chamber from the lower chamber.

The external induction heating is not satisfy to the reliable temperature control nearby discharge wall which is located at the bottom of a bushing.

All together these factors do not allow maintain uniformity of the temperature in the area of discharge wall (U.S. Pat. No. 6,674,747).

The further development of apparatus integrated with ceramic bushings is proposed in this invention. The proposed invention discloses an apparatus which differs from those are described in previous patents (U.S. Pat. Nos. 6,647,747 and 6,125,660) by simplicity. The present invention discloses the ceramic bushing consisting discharge wall made from corrosion resistant ceramic materials such as: B4C, BN, Cr2O3—but not limited. Some of them consisting additives which thermodynamically increase the stability and the corrosion resistance of the ceramic materials in the melted basalt glass body environment.

To avoid melted basalt leak via gap between different parts of bushing (made from different ceramic materials), the adjusted gaps are filled out by the sealer-interface material having extremely high temperature melting point combined with plasticity properties, for example BN (white powder), or from the same chemical composition powder material. The ceramic bushing is made from plurality of orificed ceramic plates. Wherein the ceramic plates comprising a discharge wall functionality is to maintain the fiberization process-only. The temperature (1450 C-1550 C) of basalt glass body inside of the lower chamber of the bushing (above discharge wall) is achieved by using a heating element made from refractory electric conductive materials. For example, from Mo—molybdenum, MoSi2. Or from Cr—Fe-M; Cr—Mo-M; Cr—Ta-M; Cr—Re-M; Cr—Os-M-based alloys (where M—a metallic alloying element which is add. to reach the enhanced plasticity and the corrosion resistant properties). To produce such alloys the high-temperature powder sintering, D-Gun or arc plasma deposition technique is used rather than conventional metallurgical casting. These methods provide an important advantage versus conventional metallurgical process. Because not always possible produce chromium reach alloys (Cr-based alloys) with such refractory metals as: Mo, Re, Os etc. having melting points much greater than that of chromium (Cr). The melting point of chromium (Cr): $T_{m.p.}=1863$ C. In addition metallic chromium exhibit high partial pressure of vapor. Therefore Cr rather evaporated before the melting points of Mo, Re, Os will be achieved: 2623 C (Mo) to 3033 C (Os) and 3186 C (Re). Wherein the concentration of alloying elements for some parts of multisectional ceramic bushing should not exceed 20% (atomic percent).

The mentioned above Cr—Mo-M; Cr—Os-M; Cr—Re-M-based alloys commonly brittle. Nevertheless they can be prepared by not metallurgical casting process, because, for example heater in a shape of plate is not requires the precision machinery treatment during preparation. And it is not undergo to dynamic load action during operation. It just need to have high corrosion resistance property in basalt glass body, and alloy has to have the melting point greater than 1750 C. That is much greater than currently available Pt-Rd alloys and of course all Fe—Cr-based alloys, having melting points in range of 1450 C. The most of Fe—Cr-based alloys have been designed for orificed bushings exhibit the melting point even less than 1450 C.

SUMMARY OF THE INVENTION

The present invention is related to ceramic bushing/s consisting local heating element adapted for manufacturing continuous mineral/basalt fibers from natural basalt rocks having a variety of chemical compositions and the petrology characteristics. Several ceramic bushings are designed for apparatus capable provide all operations which needed to produce continuous basalt fibers from 7 to 20 micrometers (μm) in diameter gathered into strand. Also the coarse fibers from 20 μM to 100 micrometers (μm) in diameter can be produced in amorphous structural state which provides to fiber flexible/ductile properties suitable for reinforced composite/concrete, including Three Dimension Fiber Reinforced Concrete (3D-FRC) and many other commercial applications.

The ceramic materials which exhibit high corrosion and thermal shock resistance are suitable to make key members if ceramic bushing capable withstand basalt glass body action at the temperatures from 1250 C to 1800 C. Wherein different parts of bushing are made from different ceramic materials. For example, side walls of bushing are made from corrosion resistant chromium oxide Cr2O3 ceramic with small additives; Yttrium stabilized ZrO2, Al2O3, 3Al2O3+2SiO2; LaCrO3+CaO etc. The orificed plates of discharge wall of the bushing is made from oxide ceramics with enhanced mechanical stability, thermal shock and corrosion resistance: SnO2, ZrO2 (with Yttria oxide (Yt2O3), CaO MgO additives), Al2O3 (with ZrO2, TiO2 additives), also from non oxide ceramics such as: B4C with BN additives; or MoSi2 reinforced by Al2O3, SiC fibers, Yttrium oxide (Yt2O3) prepared utilizing high temperature powder sintering technology. The ceramic orificed plate referred as discharge wall is attached to the bushing from the bottom.

Wherein different versions of ceramic bushings consisting local heating element are disclosed:
- (a)—one chamber ceramic bushing having electric resistance heater made in a shape of longitudinally extended plate is installed at the lower chamber of bushing, positioned right above the ceramic plate/discharge wall,
- (b)—two chambers ceramic bushing consisting upper and the lower chambers, wherein external optional induction heating system applied to heat basalt glass body inside of upper chamber, wherein the lower chamber consisting internal electric resistant heater made from refractory electric conductive material. Wherein anode-cathode electrode heating system is applied as alternative to induction heating applied to the upper chamber of the bushing.
   - Two chamber ceramic bushing having angled side walls (reducing size from the top to the bottom) is installed at the bottom of feeder platform without an additional supporting hardware.

Wherein different ceramic orificed plate/discharge wall are disclosed:
- (a)—ceramic bushing/s with angled side walls, which allow easily installed bushing at the bottom of feeder's forehead platform.
- (b)—ceramic plate having vertically upward extended side walls to prevent basalt glass body leakage. Such design allows attach plate beneath the bushing at the bottom. It also can be easily replaced.
- (c)—in special embodiments ceramic orifice plate is installed via horizontally extended slots. Such plate is movable and can be easily replaced.

The ceramic bushings consisting electric resistant heating element are presented on FIG. 1 and FIGS. 1-A and 1-B; also on FIG. 2 through FIG. 5. All presented configurations having heating element positioned nearby the ceramic orifice plate that allows precision temperature control of fiberization process beneath of discharge wall. The basalt glass body is heated inside of bushing by electric resistant heater having plurality openings (FIGS. 1-A and 1-B). The longitudinally extended heater is made either from Mo—Cr—Al, Mo—Nb—Al, Mo—Ta, Mo—Re-based alloys, or from disilicide molybdenum MoSi2 reinforced by Al2O3 or Carbon fibers; or MoSi2 composite reinforced by SiC or Si3N4 fibers. Wherein the functionality of openings of the heater is to let basalt glass body flow from the upper chamber to the lower chamber of bushing finally to discharge wall. The temperature of heater should be in range of 1500 C-1650 C. The heaters should capable maintain temperature of glass body inside of the lower chamber of bushing in range from 1450 C to 1550 C. The glass body inside of upper chamber of bushing can be additionally heated by induction heater if needed. To absorb energy of induction electromagnetic field at frequencies in range of 10 KHz to 1.5 MHz the crucible made from electric current conductive ceramic (ZrO2 with mentioned additives or LaCrO3 with CaO additives (to 8 wt %) is installed inside of the upper chamber of ceramic bushing. The anode-cathode electrode heating can be applied to upper chamber of the bushing as alternative to induction heating. The electromagnetic wave transparent ceramic SiN/Si3N4 is used for side walls of bushing when an induction heating is applied to the upper chamber of a bushing. The one chamber ceramic bushing is used when the height of side walls is small, and the electric heater capacity great enough to maintain temperature inside of ceramic bushing in range of 1450 C-1550 C. One chamber bushing usually consisting heater operating at low voltage current (to 100 Ams). The hydrostatic pressure is regulated by diameter of openings through the heater plate. While the electric conductive heater is positioned 20-30 mm above the orifice plate/discharge wall. The functionality of ceramic orificed plate is to form suitable shape cones when basalt glass body emitted from orifices at suitable temperature. For some basalt rocks (Gray Dresser Trap Basalts) fiberization proceeds at temperature in range of 1240 C-1280 C. The ceramic coatings are applied using HVOF plasma or D-Gun spray technology if needed to adjust the wetting angle between the tipped orifices of ceramic plate and basalt glass body to avoid flood when elemental fibers are drawn.

This invention (as opposed to U.S. Pat. No. 6,647,747) discloses the ceramic bushing consisting internal electric heating system is installed inside of the lower chamber 30 of a bushing. The advantage of this invention is that heating element is positioned nearby orificed discharge wall nearby therefore allows the precision temperature control nearby the orificed ceramic plates. The basalt glass body is heated nearby discharge wall using electric resistant heater made from metallic material in a shape of longitudinally extended intermediate plate having plurality of openings (which diameter is greater than that of orifices). The longitudinally extended heater made from Cr—Re-M; Cr—Mo-M; Cr—Nb-Me based alloys, or from Mo—molybdenum (molybdenum based alloy); or from MoSi2. Wherein the functionality of the openings through the heater is to let basalt glass body flow from the upper to the lower chamber discharge wall at the temperature in the range of 1450 C. The heater is made from Cr—Re-M; Cr—Mo-M; Cr—Nb-M-based alloys or from molybdenum/molybdenum alloys (or MoSi2) capable to maintain the temperature inside of the lower chamber of bushing in a range from 1450 C to 1550 C.

The glass body inside of the upper chamber can be heated by induction heating. Commonly (0.8-1.5 MGz) frequency induction heating is applied. In this case the cylinder (heat capacitor-heat source under induction heating) is made from material having current conductive property. It is installed internally inside of the upper chamber of ceramic bushing. This cylinder, however, is not needed when the anode-cathode electrode heating system applied (instead induction heater) to heat basalt glass body inside of the upper chamber of the bushing.

The electromagnetic wave transparent ceramic SiN/Si3N4 (instead Cr2O3 ceramic) is used to make side walls of a bushing if induction heating is applied to heat basalt glass body inside of the upper chamber of a bushing. The induction (and an electrode heating) is not needed when a one chamber bushing is used. The one chamber ceramic bushing is used instead two chambers bushing when the height of side walls is small, and the electric heater capacity great enough to maintain the temperature inside of ceramic bushing in range of 1450 C-1550 C. One chamber bushing usually has a heater by capacity is in range of 15 Kwt. Wherein the low voltage (6V) current by thousands Amps is applied. The hydrostatic pressure is regulated by openings made through the body of heater plate. The primary functionality of the heater is to heat basalt glass body inside of the lower chamber of a bushing. The heater is positioned 20-30 mm above the discharge wall. The primary functionality of discharge wall is to withdraw basalt glass body from the cones are formed beneath the discharge wall.

Basalt glass body cones are formed and the fiberization processes proceeds at the temperatures in range from 1260 C-1280 C. The wetting angle of basalt glass body in contact with discharge wall made from ceramic material depends on the basalt glass body viscosity and wetting characteristics. The metallic-ceramic coatings utilizing D-Gun powder spray or Arc Plasma Spray technology are deposited to adjust the basalt glass body wetting angle with discharge wall ceramic material. These coatings are used to avoid the flood process which could develop beneath the discharge wall. The flood process do not allow the fiberization and fiber draw process run properly.

The Primary Invention of this Patent Includes:

(a)—the ceramic bushing/s consisting local heating element integrated with apparatus adapted to provide operations which are needed for forming continuous fibers to be drawn/attenuated into a strand of elemental fibers in diameters from 7 to 20 micrometers (μm), and also the coarse fibers having ductile properties at the diameters from 20 to 100 micrometers (μm) which are suitable for 3D FRC applications, (b)—the bushings integrated with furnace consisting melting chambers to melt efficiently basalt rocks, wherein each chamber has own inlet for grinded basalt rocks to be melted, wherein chambers are positioned opposite each other on the level 300 mm-500 mm higher than the level of collector's platform—receiver. The different level of melting chambers and the collector promotes melted rock cascade to flow to intensify the mixing, volatile elements degassing, the high melting point contaminant's distraction to provide the glass body homogenization, suitable for further sequence operations. Wherein the natural gas burning process proceeds with additive of oxygen to melt basalt rocks efficiently. The induction heating can be also used to melt basalt rocks inside of the melting chamber efficiently. Wherein a heat recuperation system is applied to increase the temperature of gas combustion.

(c)—movable tipped valley associated with melting chamber having adjustable angle to provide basalt melted rock turbulence to flow from the melting chamber to the collector. Wherein the melting chamber can be removed for repair or replacement operation if needed, while the other melting chamber remains in operation. The intermediate thermally insulating panel is installed to provide removal/repair operation. It is installed through the gap (slot) made on the back side wall of the furnace. In specific embodiments furnace consists one melting chamber in operation. Wherein the tipped valleys are installed each other (smaller inside of the bigger). Wherein the slop (angle) of valleys is great enough to provide melted basalt turbulence to flow efficiently. Wherein the higher the viscosity of the melted basalt rock, the greater the angle of the sloped valley.

(d)—horizontal platform—melted basalt rock receiver. Horizontal platform-receiver is located inside of the collector in a place where the melted basalt rock glass body comes from valleys to the collector when flows through valley toward the collector.

(e)—horizontally extended collector—a key member of apparatus is designed to provide glass body homogenization, averaging by chemical composition and the viscosity. Wherein the primary functionality of collector is to provide basalt glass body homogenization. Wherein the depths of glass body inside of collector is in range of 50 millimeters. Wherein the bottom of collector is positioned on the same level what have the bottom of the feeder forehead.

(f)—Two sleeves associated with forehead of a feeder, wherein sleeves are divided from collector by slots/or steps to trap the high gravity contaminants which periodically outlet from the furnace. Wherein glass body inside of a feeder is heated by burners utilizing natural gas, wherein burners are positioned on the top/seal of collector and a sleeves of a feeder. Wherein the front wall of the collector and the sleeves are made from the refractory, wear and corrosion resistant material, for example, from high-chromium ceramic $Cr_2O_3$ (95-97%), capable to withstand basalt glass body action at the temperature over 1500 C. Wherein the sleeves of a feeder are designed to deliver homogeneous basalt glass body to the forehead—area where from glass body is taken off to the bushing. Wherein the forehead appears an extension of the sleeve.

(g)—Ceramic bushing/s integrated in apparatus. Wherein ceramic bushing is made from a high-temperature, corrosion resistant ceramic, for example, from high-chromium ceramics: $Cr_2O_3$ (95-97%) with o additives of zirconia/alumina and titania). Wherein a high-frequency electromagnetic wave transparent ceramic such as $Si_3N_4$ (but not limited) also used in a bushing when an external induction heating is applied to heat basalt glass body inside of the upper chamber of a bushing. As soon basalt glass body exhibits low thermally conductive and the low heat transparent properties, the local heating of basalt glass body is provided to avoid the temperature gradient which causes basalt glass body crystallization. The additional heating element (electric heater) is used to prevent crystallization of basalt glass body inside of the bushing. Wherein the additional induction heating of basalt glass body inside of the upper chamber of the bushing is applied if the electric heater power capacity not great enough to maintain basalt glass body at the temperatures in range from 1450 C to 1550 C.

(h)—An external water cooled induction and/or internal cathode-anode heating system are applied inside of the upper chamber of ceramic bushing.

(i)—Internal crucible heat capacitor-member of bushing is installed inside of the upper chamber of ceramic bushing when an external induction heating is applied. Wherein the bottom of crucible consisting holes to provide basalt glass body to flow from the upper to the lower chamber to avoid the temperature gradient between the upper and the lower chambers of a bushing.

(k)—The height of the upper chamber of ceramic busing is greater than that of the lower chamber. Wherein the internally installed crucible (heat capacitor) functionality is to heat basalt glass body by energy of electromagnetic field generated by external induction generator operating at the frequencies from 0.1 to 1.8 MHz.

(l)—Internal heater made from metallic material in a shape of longitudinally extended plate having plurality of openings, wherein the heater is located inside of the lower chamber of ceramic bushing to control the temperature of basalt glass body nearby the ceramic orificed discharge wall. Wherein the internal heater is made from refractory metallic material, for example: corrosion resistant SiC (1650 C) Mo; MoSi2; MoSi2-Kanthal Super 33 (1800 C); MoSi2-Kanthal Super (1900 C); Ta, Nb, Nf-based alloys; Cr—Re-M; Cr—Mo-M; Cr—Os-M based alloys having temperature operation up to 1750 C. Where M an additional metal alloying element to improve rge corrosion resistance of alloy (having basic composition) in basalt glass body. M-metal alloying element is used to make special parts/sections of ceramic bushing. The internal electric heater is located 20-40 mm above the ceramic orificed discharge wall. It is assembled with bushing before the discharge wall, e.g., firstly installed the heater plate upward from the beneath of ceramic bushing and after the multi-sectional ceramic discharge wall is attached to the bushing from the bottom. Wherein the vertically extended side walls of ceramic o discharge wall support the electric heater plate. Wherein a gap between the ceramic discharge wall and the heater is defined by the height of vertically extended side walls of ceramic discharge wall. Wherein the distance between the ceramic discharge wall and the metallic heater depends on heater capacity and basalt glass body characteristics: viscosity, heat transparency, thermal conductivity etc. parameters. Wherein the functionality of the openings of a heater is to provide basalt glass body flow to the discharge wall. Wherein the diameter and the quantity of the openings made through the body of a heater is defined by viscosity and the hydrostatic pressure of glass body acting on the surface of the multi-sectional discharge wall. Wherein a plurality of corrosion resistant SiC (1650), or Kanthal Super 1900 (MoSi2) SG type heater can be used instead the Mo- or Cr-based alloys heater made in a shape of plate (having holes).

(l)—the ceramic orificed discharge wall having plurality of orifices attached to the bottom of ceramic bushing. Wherein discharge wall can be made both from chromium oxide ceramics such as: Cr2O3 (with additives alumina zirconia, titania) including SnO2, ZrO2+Al2O3 or from non oxide ceramics such as: B4C; Si3N4+Al2O3; TiB2+TiC (80%-20%) or (TiCr)B2 ceramics having melting points over 2250 C. Wherein SnO2 exhibits high dimension stability and corrosion resistant at the temperatures 1240 C-1280 C and electric conductive properties at the temperatures up to 1400 C. Wherein discharge wall made from SnO2 can be heated by electric current, e.g., can serve as a heater and as a discharge wall simultaneously. Wherein the removable discharge wall made from SnO2 is considered as extension (second wall) of the main discharge wall.

DETAIL DESCRIPTION OF THE FIGURES

Figure 1:
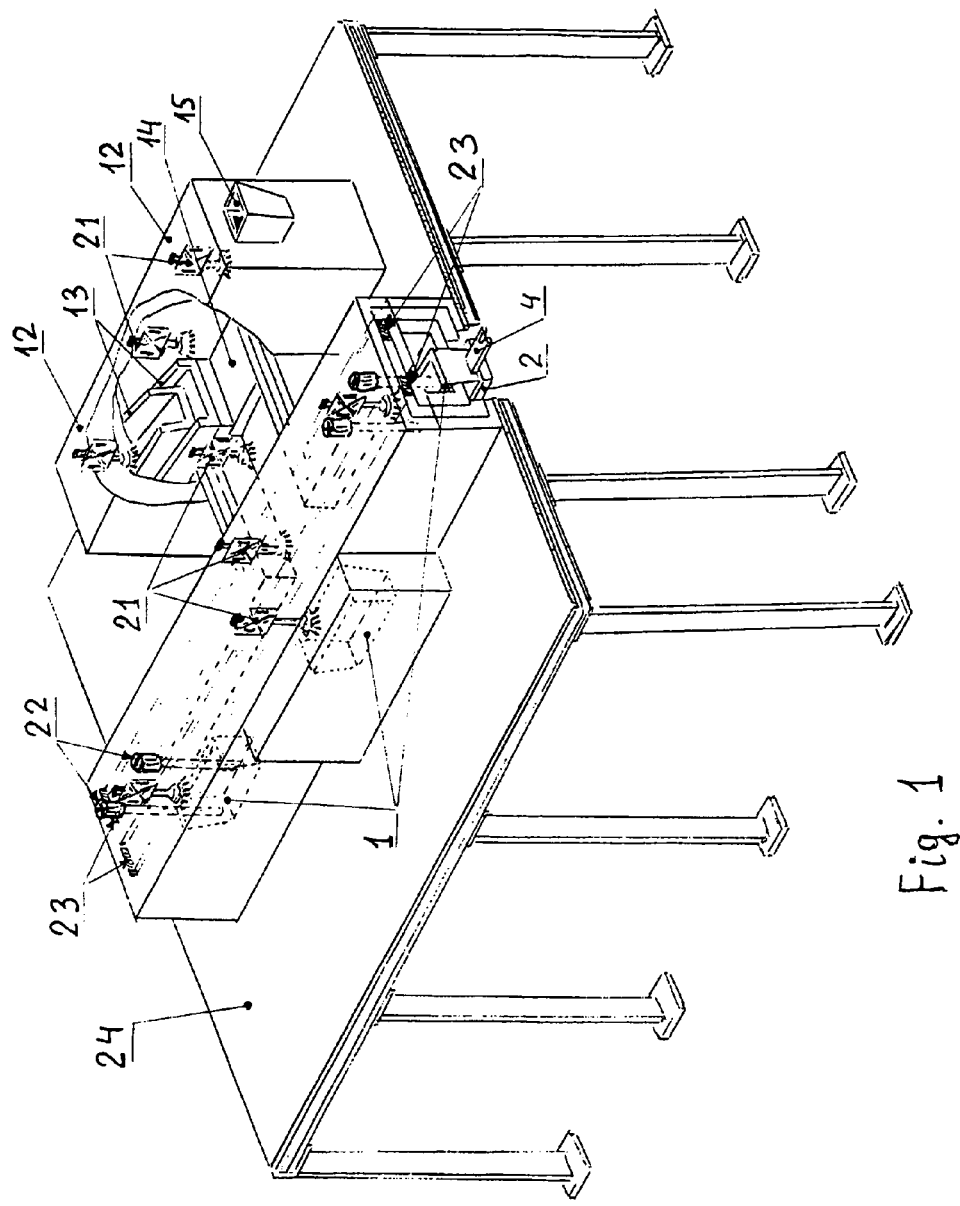
FIG. 1.—General view of ceramic bushings integrated in apparatus. Having T-shape feeder. Three ceramic bushings are located beneath of T-shape feeder FIG. 2. Cross-sections of two chamber ceramic bushing. The external induction heating is associated with upper chamber and the internal electric heating is installed inside of the lower chamber of the bushing. The ceramic orificed discharge wall is attached to the beneath of bushing—from the bottom.

FIG. 1-demonstrates general view of apparatus having three ceramic bushings—(1). It consists two melting chambers—(12); Gas burners—(21) are located on the top (seal) of the furnace to heat melted basalt glass body inside of the collector and a feeder;

The internal anode-cathode electrode heating—(22) is. considered as alternative to external induction heating applied to the upper chamber of the bushing. The air and gas heat recuperation system—(23) is located on the top of furnace. The basalt rock inlet—(15). Metallic platform—(24) where the apparatus is mounted. The slopped valleys—(13) provide glass body turbulence to flow. Horizontal platform-melted basalt rock receiver—(14) is located inside of the collector—(16). Two slopped valleys: smaller (upper) and bigger (lower) are installed each other—(13). The melted rock flows through the valleys slapped toward collector to provide melted basalt rock turbulence to low. Two foreheads are associated with a feeder where from basalt glass body is supplied to the bushings. Two sleeves of a feeder provide glass body distribution to the bushings. The top range of ceramic bushing is extended above the bottom of the feeder by an amount to prevent the entrance of high-gravity high-melting point contaminants to the bushing. The level of the upper range of ceramic bushing is extended above the bottom of a feeder about 15 millimeters, however no more than 20 millimeters. The low rate of basalt glass body to flow in this layer reduces the wear of the bottom of the collector and a feeder foreheads.

Figure 2:
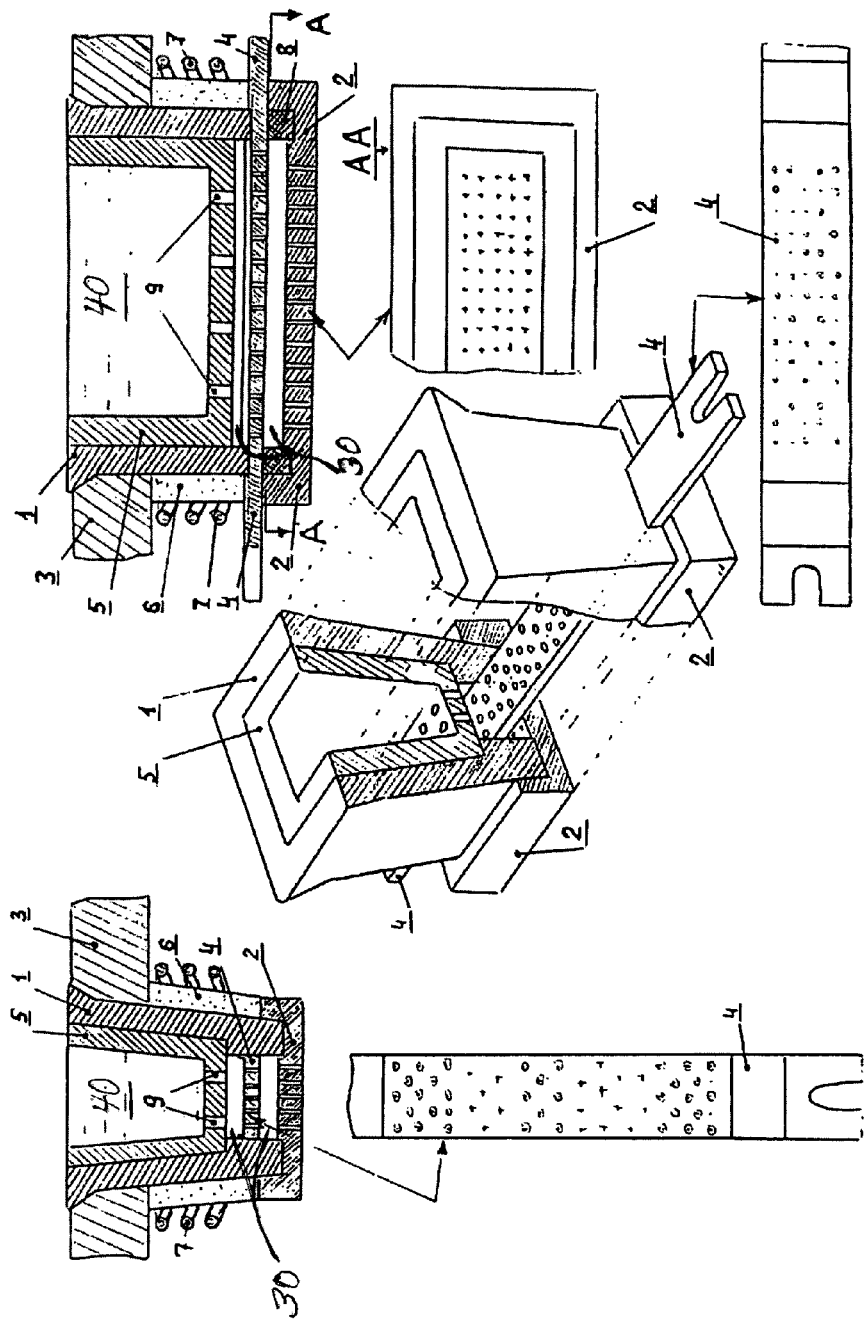

FIG. 2—General view and projections of cross-sections of ceramic bushing—(1). It presents two chamber bushing having an upper chamber 40 and a lower chamber 30. Wherein the bottom of the internal crucible 5 is located inside of upper chamber of bushing consists the holes—(9) which allow basalt glass body to flow from the upper chamber to the lower. The openings—(9) at the bottom of the internal crucible (5) functionality includes also regulation of the hydrostatic pressure inside of the lower chamber which acting on the orificed discharge wall. The internally installed inside of upper chamber crucible—(5) main functionality is to maintain a heat is generated under an external induction electromagnetic field action. Therefore crucible (5) has to be made from the current conductive (corrosion resistant) material. It could be made from Mo-based alloy or from corrosion resistant SiC (1650 C), or from Cr—Mo-M-based alloy. Cr concentration 60-80% (by weight).

The heating element—(4) inside of the lower chamber of the bushing functionality is to provide precision temperature control of basalt glass body nearby discharge wall. The internal electric resistive heater—(4) in a shape of longitudinally extended plate having plurality of the openings is located inside of the lower chamber of bushing between the bottom of crucible—(5) and a discharge wall or floor—(2) that forms a lower boundary of the lower chamber 30. Wherein the ceramic orificed discharge wall or floor—(2) is attached to the bottom of the bushing—(1). Wherein the external induction heater—(7) functionality is to heat basalt glass body inside the upper chamber of the bushing. It generates Joule heat under the high-frequency electromagnetic field action which is produced by induction heater operating at frequencies from 0.1 to 2.0 MHz. The bushing's heat insulation layer—(6); sealer's—glass body freezers—(8) are used to prevent leak of melted basalt glass body.

Figure 3:
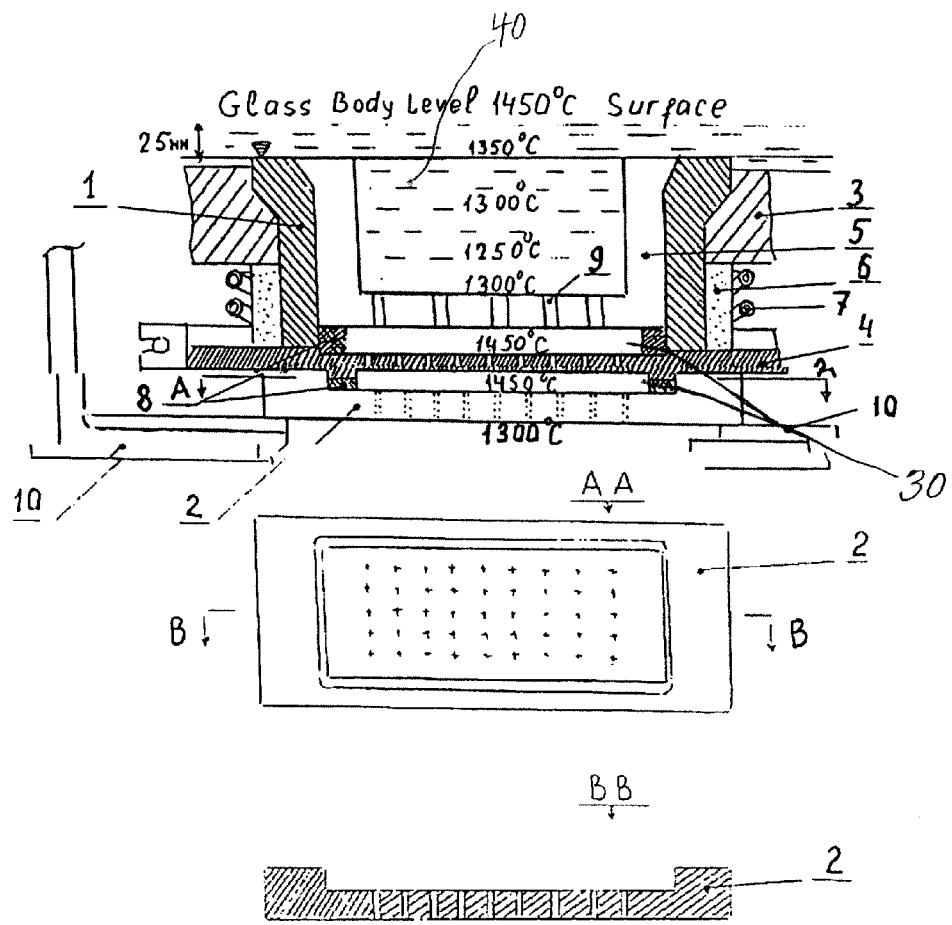
FIG. 3. Schema of temperature zones of two chamber ceramic bushing. The temperature zones inside of bushing are shown when internal electric heating is in operation. The external induction heating is shot down.

FIG. 3-Two chamber ceramic bushing consisting internal electric heating element in a shape of longitudinally extended plate—(4) located in the lower chamber of bushing; external induction heating system—(7) is associated with upper chamber of ceramic bushing; the primary ceramic orificed discharge wall—(2) is attached to the bottom of the bushing. The discharge wall attached to the bushing is supported by trusses (10) are connected with metallic structure where the apparatus integrated with bushings mounted. The scheme of temperature zones shown on different depths of a bushing (from upper and the lower chambers). It is supposed that such temperature gradient field relates to situation when the external induction heating is turned off, however a gas burning (inside of collector and a feeder) and the internal electric heater inside of the lower chamber of bushing are remaining in operation. The external induction heating is used to reduce the temperature gradient inside of the upper chamber of bushing which might cause the basalt glass body crystallization at the temperature below the upper temperature of crystallization, e.g., below 1300 C. The additional induction heater heats basalt glass body inside of the upper chamber of the bushing.

The internal cathode-anode electrodes heating inside of the upper chamber is considered as an alternative to the induction heating.

It is needed to emphasize that cathode-anode heating is considered rather as alternative to induction heating. These heating systems are used if the height of the upper chamber of the bushing is greater than 100 millimeters. However they do not used if the height bushing is less than 100 millimeters. In this case the internal electric heating element—(4) (in a shape of longitudinally extended plate or rods) only used. It is supposed that the power capacity great enough to maintain the temperature nearby discharge wall in a range of 1450 C. The small size bushing consists electric heating element inside of a bushing therefore it does not require the additional induction heating and the cathode-anode heating. The one chamber ceramic bushing is applied instead one chambers for small size bushing.

Figure 4:
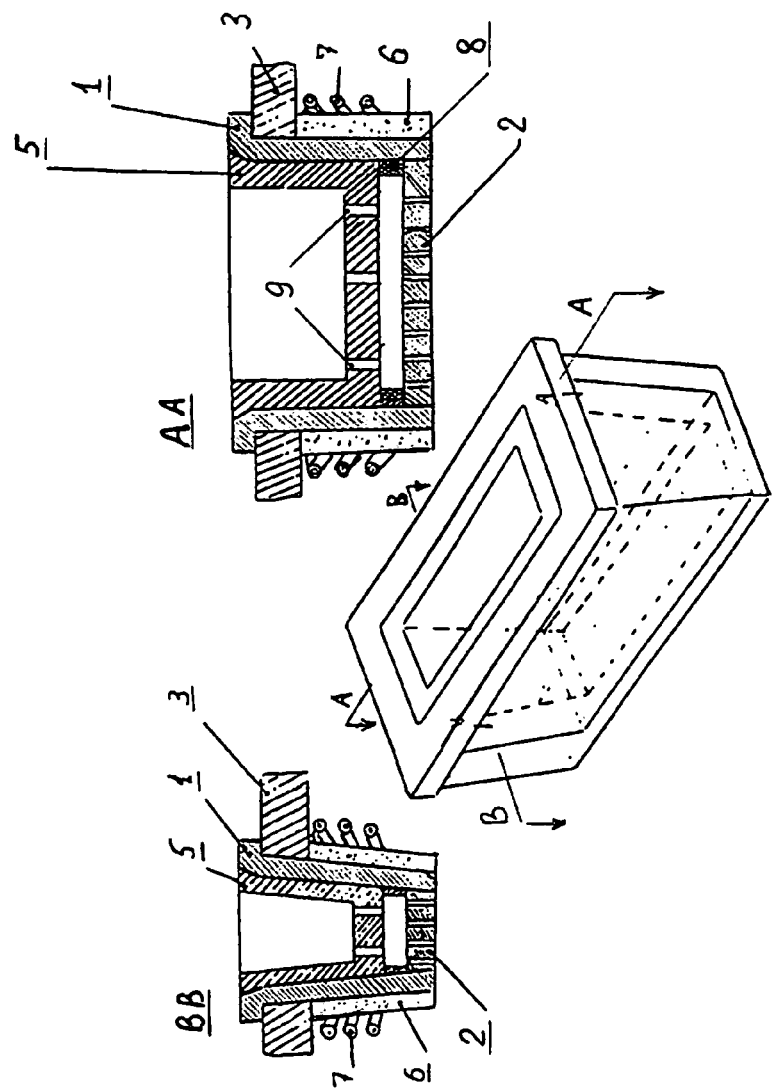
FIG. 4 a, b. General view and cross-sections of two chamber ceramic bushing. The ceramic orificed discharge wall is installed in conjunction of tipped end of ceramic bushing.

FIG. 4 (a, b)—Cross-section of two chamber ceramic bushing. The ceramic orificed discharge wall is installed inside of the tipped end of bushing. In this design discharge wall appears to be the bottom of ceramic bushing. There is no internal electric heater shown on FIG. 4. The two chamber ceramic bushing cross-sections having external induction heating—(7) is shown on FIG. 4 (a).

The cross-sections AA and BB demonstrate two chamber bushing having crucible—(5) which appears to be upper chamber of a bushing. One chamber bushing uses either external induction or internal electric heater by power capacity 10-15 Kwt.

The electric heater generated Joule heat by the low voltage (6 V) current by thousands Amps.

FIG. 4-(b) demonstrates two chamber bushing consisting movable orificed ceramic plates—(25) instead discharge wall—(2). Wherein the movable plate (25) is installed via slot holders—(26) in conjunction with side walls of the ceramic bushing—(1). It is installed beneath the primary discharge wall—(2). It is need to note that movable/removable orificed plate—(25) can be made in from of sections which periodically are replaced by new ones.

Figure 5:
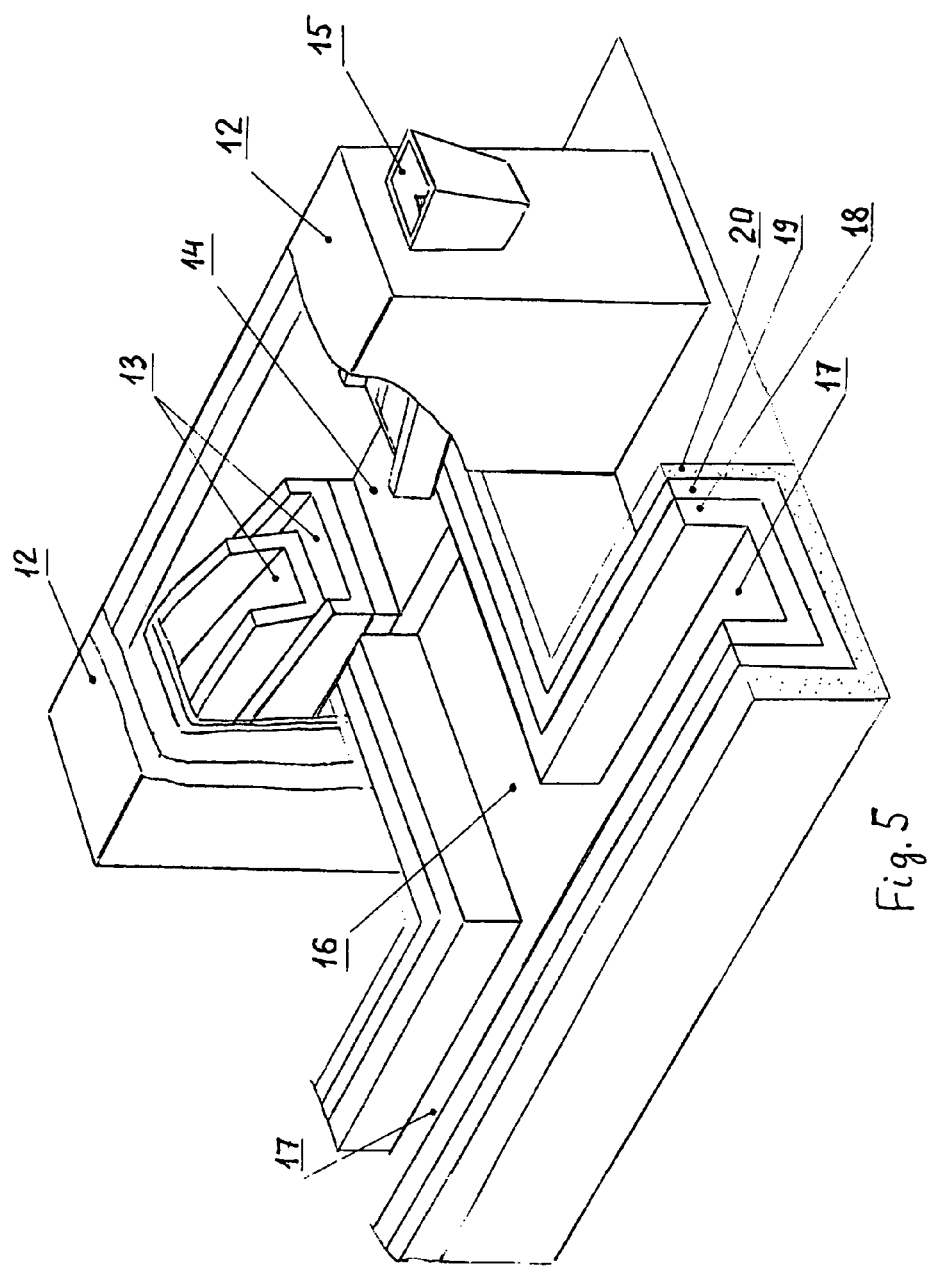
FIG. 5. General view of cross-section of furnace having two melting chamber, and a T-shape feeder.

FIG. 5—Cross-section of furnace unit consisting two melting chambers—(12); a T-shape feeder—(16) of apparatus comprising two sleeves—(17). Each chamber has two tipped valleys—(13) slopped toward collector—(14). The horizontal platform—glass body receiver—(14). Basalt rock inlet—(15) is associated with melting chamber. Front wall—(18) is made from the most refractory corrosion resistant material likely from chromium ceramic. More specifically from high chromium oxide Cr2O3 95-97%); To the front wall adjusted intermediate layer—(19) and external thermally insulation layer—(20).

DESCRIPTION OF THE INVENTION

The apparatus integrated with ceramic bushings is disclosed to provide a sequence operations: mineral (basalt) rock melt inside of the melting chambers—(12); volatile elements degas, glass body mixing via turbulent flow from melting chamber (12) through valley—(13) sloped toward collector (16); glass body homogenization inside of collector—(16); glass body distribution to the ceramic bushings (1) via feeders—(17).

The ground rock material is supplied via inlet—(15). Basalt Rock is melted inside of the melting chambers using combination of gas burners—(21) and an induction heating (not shown here). The glass body is heated by gas burners—(21), shown on FIG. 1, positioned on the seal—top of collector—(16) and the feeder—(17), shown on FIG. 5. Each ceramic bushing has own (local) heating system capable to maintain the temperature 1450 C inside of ceramic bushing. The local heating system allows avoid the temperature gradient by depths which takes place due to the low heat-transparent (low thermally conductive properties) of basalt glass body. At the lower chamber 30 of bushing basalt glass body is heated by electric heater—(4) shown on FIGS. 2,3, made either in a shape of plate 4 [from metallic material capable to withstand basalt glass body action at temperature up to 1650 C when the low voltage (6 V) current by hundreds/thousand Amps is applied to the heater], or in shape of the rods. For example from: Silicon Carbide "Global" SiC—1650 Electric Heating Elements. Or MoSi2 Kanthal Super—1900. The electric heater—(4) (FIGS. 2,3) is located above the ceramic orificed discharge wall or floor—(2). Such heater allows to maintain a suitable temperature nearby discharge wall. Inside of the upper chamber of ceramic bushing—(1)—FIG. 1 through FIG. 3, is positioned a crucible—(5)—FIGS. 2,3. The bottom of crucible having holes—(9)—FIGS. 2,3, divides the internal space of bushing onto two volumes: upper and the lower chambers.

The external induction heating, inductor—(7) (the first heater), generates the current inside of the current conductive crucible—(5) a Joule heat under the high-frequency electromagnetic field action. The anode-cathode heating—(22)—shown in FIG. 1, can be applied to only to the bushing made from ceramic material and no way to the Pt-Rd bushing because the iron reacts with platinum. More specifically electrode heating (as alternative to induction) is applied to the upper chamber of ceramic bushing (instead the induction heating). The material for anode-cathode electrodes to heat basalt glass body inside of the upper chamber of ceramic bushing can be used such as: SnO2 or molybdenum Mo, or MoSi2. The electric heater plate—(4) consisting openings—(9) with diameter greater than that of orifices of discharge wall. In specific embodiments the upper and the lower chambers of the bushing are divided by plate made from molybdenum (Mo) or Mo-based alloy. This plate is heated by high-frequency electromagnetic field generated by inductor. It can be made from Cr-based alloy with Re, Os, Ir, Mo additives in range of 10 to 20% (by weight). The chromium content is varied from 60 to 80%.

No precision mechanical treatment is required for this heater. The external water cooled coils of inductor—(7) are positioned around the external walls of upper chamber of ceramic bushing. The longitudinally extended plate (made from Cr—Re—X based alloy) having plurality of opening—(4) is positioned 20-40 mm above the discharge wall—(2). The trap—freezers and/or sealer are used in the junctions of ceramic bushing parts are assembled into one unit of bushing—(1). The heat recuperation channels—(23)-FIG. 1, are used to recycle heat of to increase the temperature of natural gas combustion. The preliminary heating of air and the natural gas increases the temperature inside of the melting chamber, collector and a feeder.

An apparatus integrated with ceramic bushing/s for manufacturing from the natural heat softanable material (basalt rocks) the continuous basalt fibers (gathered into strand) at the diameters from 7 to 20 micrometers, and the coarse fibers from 20 to 100 micrometers in diameter having ductile/flexible properties. Wherein the ceramic bushing is designed to replace platinum-rhodium (Pt-Rd) metals which limit the efficiency of basalt fibers production and their commercial applications.

Wherein the apparatus integrated with ceramic bushing/s comprises members:
(a) Two melting chambers—members of apparatus of claim 1,
(b) Two slopped valleys—members of apparatus of claim 1, consisting movable tipped valleys positioned each above other, wherein valleys provide melted rock turbulence to flow, wherein each valley appears an extension of other.
(c) Horizontal platform—member of apparatus of claim 1, farther referred as melted rock material receiver is positioned inside of the furnace interior-collector.
(d) Collector—member of apparatus of claim 1. Wherein collector appears an interior of furnace where glass body is homogenized at temperature 1450 C.
(e) Feeder-glass body distributor—member of apparatus of claim 1. Feeder comprises two sleeves—foreheads where from basalt glass body is supplied to the bushings, wherein the upper part—top of bushing is extended 10-15 mm above the bottom of the feeder sleeves to prevent the entrance to the bushing high gravity high-melting points contaminants.
(f) The ceramic bushing integrated with apparatus of claim 1, wherein the body of said bushing is accompanied by massive side walls. Wherein the internal space of the bushing is divided by intermediate plate into two volumes: the upper and the lower chambers.
(g) The external induction-member of the bushing integrated with apparatus of claim 1, wherein the said induction heating is used to heat said basalt glass body inside of said upper chamber of said ceramic bushing
(h) The internal cathode-anode electric heating member of bushing integrated with said apparatus of claim 1. Wherein electrode heating is located inside of upper chamber of apparatus, wherein internal electrode heating is considered as alternative to external induction heating
(i) The internal electric resistance heating element member of said bushing integrated with apparatus of claim 1. Wherein the internal electric heater in a shape of longitudinally extended plate made from electric conductive material: (molybdenum, or disilicide of molybdenum (MoSi2); Cr—Re-M; Cr—Mo-M; Cr—As-M-based alloy, or Kanthal Supra MoSi (1900), from SiC (1650). Wherein heater is located inside of the lower chamber of said Bushing and above the discharge wall. Wherein the internal heater functionality is to provide basalt glass body heating inside of the lower chamber of bushing. Wherein an internal heating in shape of plate exhibit plurality of openings, wherein the functionality of the openings is to allow basalt glass body flow to the orificed discharge wall.
(k) Discharge wall member of said bushing of claim 1, wherein discharge wall consisting plurality of ceramic orificed plates is attached to the said bushing from the bottom,
(l) The external induction and/or the internal electrode heating is used to heat basalt glass body inside of the upper part of bushing. Wherein the heating of basalt glass body inside of upper part is used if the capacity of internally installed electric heater is not sufficient to maintain basalt glass body temperature inside of the lover volume (chamber) of bushing in range of 1450 C.

What is claimed is:
1. An apparatus for manufacturing from heat softenable material to form continuous fibers, comprising:
(a) at least one melting chamber for heating the heat softenable material to facilitate flow of the heat softenable material;
(b) at least one sloped valley oriented for providing melted rock turbulence to the flow of the heat softenable material from the at least one melting chamber;
(c) a platform in a position for receiving the heat softenable material from the at least one sloped valley;
(d) a collector in a position to receive the flow of the heat softenable material from the platform;
(e) a feeder in a position to receive the flow of the heat softenable material from the collector;
(f) a ceramic bushing in a position to receive the flow of the heat softenable material from the feeder, the ceramic bushing comprising:
an upper chamber,
a lower chamber,
an internal crucible in the upper chamber with a bottom of the internal crucible forming a lower boundary of the upper chamber and having orifices therein to allow the heat softenable material to flow therethrough, and
a heater plate having a plurality of orifices therein to allow the heat softenable material to flow therethrough, the heater plate longitudinally extending across an entire horizontal area of the lower chamber between the bottom of the internal crucible and a discharge floor;
(g) the discharge floor comprising one or more ceramic orificed plates attached to said bushing at a bottom of said bushing to receive the flow of the heat softenable material and forming a lower boundary of the lower chamber; and
(h) a first heater in a position to heat the heat softenable material in the upper chamber of the bushing,
wherein the heater plate is configured to maintain a temperature inside the lower chamber of the bushing in a range of 1450 C to 1550 C.
2. The apparatus of claim 1, wherein a top of said bushing extends an amount above a bottom of the feeder to prevent entrance to the ceramic bushing of contaminants.
3. The apparatus of claim 2, with the temperature inside the lower chamber for basalt rock, and
the apparatus further comprising:
at least two of the melting chambers;
the at least one sloped valley comprising at least an upper sloped valley and a lower sloped valley for each of the melting chambers, with the upper sloped valley above and connecting to the lower sloped valley that connects to the collector to allow the material to flow from the upper sloped valley to the lower sloped valley to the collector,
at least two of the feeders, with each of the at least two feeders in a respective position to receive the heat softenable material flowing from the collector, and
further comprising a plurality of the ceramic bushings, with a respective one of the plurality of ceramic bushings for each of the at least two feeders in a position for receiving the heat softenable material from its respective feeder.
4. The apparatus of claim 1,
with the temperature inside the lower chamber for basalt rock,
the apparatus further comprising:
at least two of the melting chambers;
the at least one sloped valley comprising at least an upper sloped valley and a lower sloped valley for each of the melting chambers, upper sloped valley above and con- necting to the lower sloped valley that connects to the collector to allow the material to flow from the upper sloped valley to the lower sloped valley to the collector;

at least two of the feeders, with each of the at least two feeders in a respective position to receive the heat softenable material flowing from the collector; and further comprising a plurality of the ceramic bushings, with a respective one of the plurality of ceramic bushings for each of the at least two feeders in a position for receiving the heat softenable material from its respective feeder.

5. The apparatus of claim 1, wherein the first heater comprises an external induction heater disposed around an outside of the upper chamber of the bushing.

6. The apparatus of claim 1, wherein the at least one melting chamber comprises two melting chambers in a position opposite each other on a level higher than the platform, wherein an upper surface of the platform is located above a level of the heat softenable material on the collector to thereby allow turbulence of the heat softenable material on the collector.

7. The apparatus of claim 1, wherein the at least one valley, the platform, front walls of the collector and the feeder comprise refractory material for basalt glass body action at a temperature over 1550 C.

\* \* \* \* \*